United States Patent Office 2,742,684
Patented Apr. 24, 1956

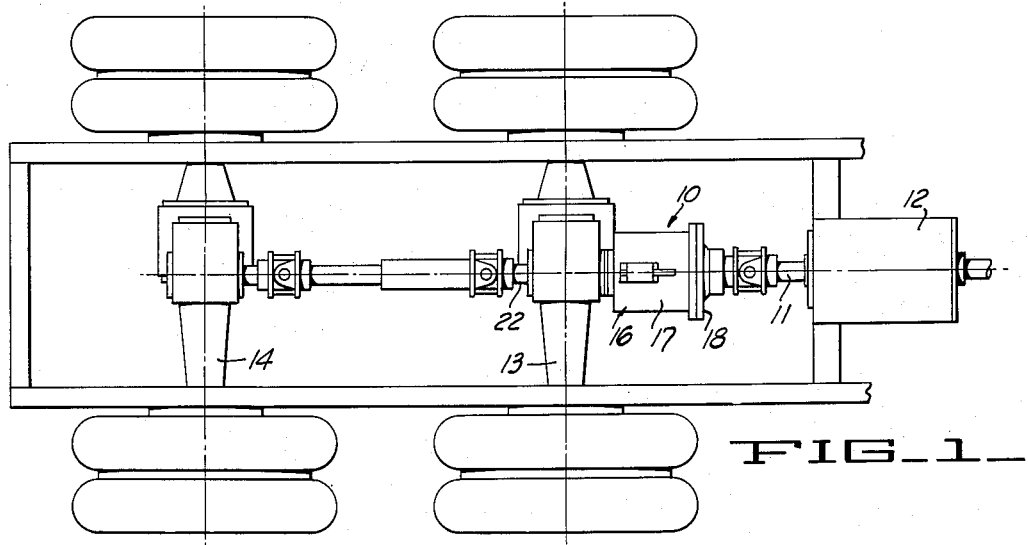
FIG_1_
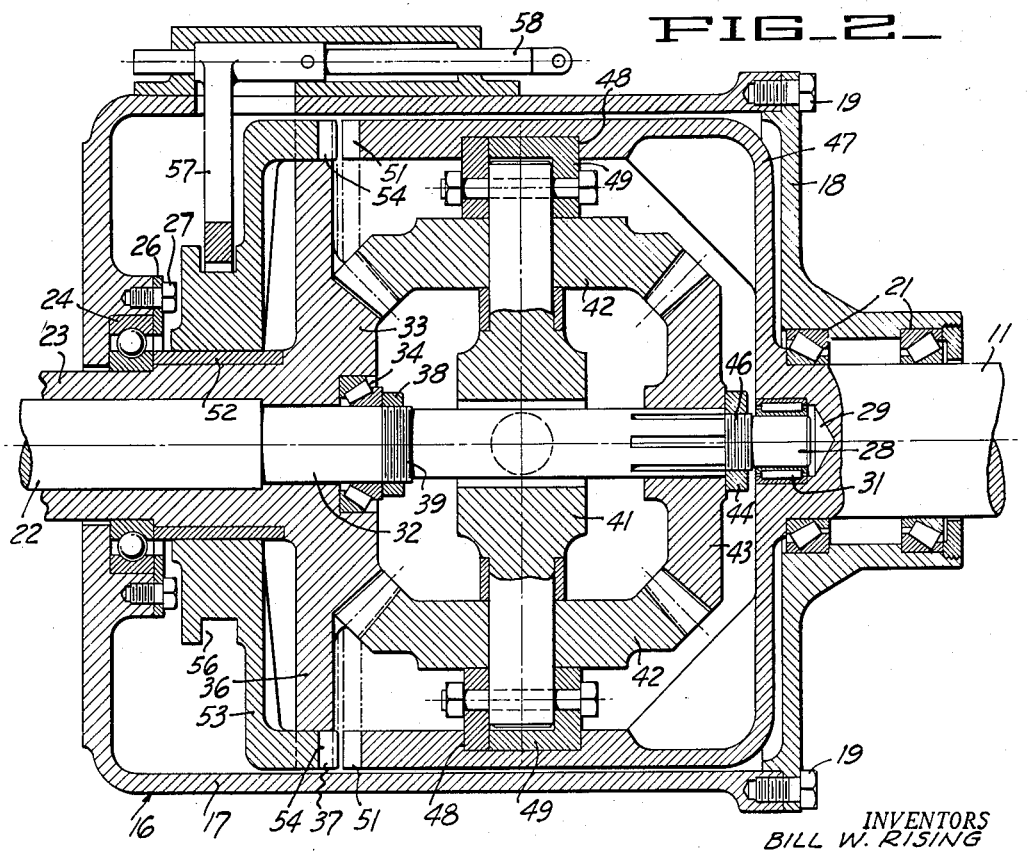
FIG_2_
INVENTORS
BILL W. RISING
MALCOLM P. STILWELL
BY
ATTORNEYS

2,742,684

POWER DIVIDER

Bill W. Rising, Redding, and Malcolm P. Stilwell, Crescent City, Calif.

Application September 23, 1952, Serial No. 311,030

2 Claims. (Cl. 74—710.5)

This invention relates to improvements in power dividers and particularly to power dividers of the type adapted for use in trucks or similar vehicles in which at least two axles are adapted to be driven. In such trucks it is desirable to have the two axles driven from the same source of power and through the same transmission. However, it is desirable that the two axles be differently connected so that differences in tire wear or tire inflation will be compensated for. It is also desirable in many instances positively to connect the two rear axles so that full driving efficiency may be obtained.

It is an object of this invention to provide a new and improved power divider of the class described which is relatively simple in construction and ease of operation and which is compact.

It is a further object of this invention to provide such a power divider in which, under normal operations, the two driven axles are differently connected so the differences in tire wear or tire inflation will be compensated for yet, when necessary, the divider may be locked so that full driving efficiency may be obtained between the two or more rear driving axles.

Other objects and advantages of this invention will be described in the following specification taken in conjunction with the accompanying drawing, in which:

Figure 1 is a top plan view of a portion of a vehicle showing our unit in its proper position;

Figure 2 is a cross-sectional view showing our power divider in "free" position;

As illustrated in Figure 1 our power divider 10 is adapted to be mounted in the drive shaft 11 between the transmission 12 and the forwardmost axle 13 of a pair of rear axles 13 and 14. The unit 10 may be secured to the forward axle 13 in any suitable manner as, for example, by being bolted thereto.

As illustrated more particularly in Figure 2 our power divider 10 is placed ahead of the forward axle, 13. The entire assembly is adapted to be housed within a casing 16 which, as shown, consists of two portions; an outer shell or casing portion 17, and a cap or head 18 which is secured to the shell by means of suitable bolts 19. The drive shaft 11 extends into the casing 16 through the head 18 and is mounted in a suitable bearing assembly 21, as shown. The bearing assembly 21 is adapted particularly to maintain the entire assembly in alignment with respect to the cap 18.

Extending outwardly from the casing 16 to the left, as viewed in Figure 2, there is a pair of driven shafts 22 and 23. The shaft 22 is an inner shaft and is connected with and is adapted to drive, through a suitable differential the rear axle assembly 14. The outer shaft 23 is a sleeve or tube which is connected to and adapted to drive the forward axle assembly 13 as will be more fully hereinafter explained. The shaft 23 is suitably mounted for rotation with respect to the casing 16 in a suitable bearing assembly 24. The bearing 24 is preferably a ball bearing assembly as shown and is held in place in the casing 17 by means of a ring 26 and bolts 27. The bearing 24 also acts as a thrust bearing.

The driven shaft 22 is, as will be noted, coaxially aligned with the drive shaft 11, and its end 28 is rotatably mounted in a cavity 29 in the shaft 11. A suitable bearing 31 is provided between the shaft 28 and the walls of the cavity 29 permitting independent yet coaxial rotation of the shafts 11 and 22. Shaft 22 is also provided with an area of reduced diameter 32 upon which there is mounted a suitable beveled sun gear 33. The gear 33 and the shaft 23 are integral and are adapted to rotate as one. A thrust and roller bearing 34 permits the rotation of the members of the shaft 23 and the gear 33 with respect to the shaft 22. Sun gear 33 is also provided with a radially extending disc 36 the outer periphery of which is provided with a number of teeth 37 whose purpose will more fully hereinafter be explained. The bearing 34 is held in proper position by a take-up nut 38 which cooperates with threads 39 on the shaft 22.

The shaft 22 also supports a rotatably mounted spider 41 whose four arms support in a suitable manner four pinion gears 42 which mesh with the sun gears 33 and 43. Sun gear 43 is suitably keyed to the shaft 22 as indicated. The sun gear 43 is held on the shaft 22 by a nut 44 which cooperates with threads 46.

The shaft 11 is provided with a cage 47 as shown. Cage 47 is provided with four cavities 48 which through four assemblies 49 retain in proper position the ends of the arms of the spider 41. The assemblies 49 are conventional and need not be more fully explained or described other than to say that they retain the spider in fixed and proper position.

The forward lip of the cage 47 is provided with teeth 51 whose purpose will also more fully hereinafter be explained.

A sleeve 52 is provided around the shaft 23 as shown and forms a bearing upon which a member 53 may be slid longitudinally. The member 53 is provided with a number of teeth 54 and is also provided with an annular groove 56 which accommodates a yoke 57 which is operated by a suitable member 58. By operation of the member 58 the yoke 57 will, through frictional engagement with the groove 56 move the member 53 longitudinally with respect to the member 23.

The teeth 54 in the member 53 are at all times in engagement with the teeth 37 in the disc 36.

The device as illustrated in Figure 2 is in what is known as free or disconnected position. By this we mean that the teeth 54 are not in engagement with the teeth 51 in the cage 47. When the device is in the disconnected position it is apparent that the member 53 and shaft 23 rotate differentially with respect to the drive shaft 11 and the cage 47.

However, when the member 53 is moved to the right as viewed in Figure 2 until the teeth 54 thereof engage the teeth 54 thereof engage the teeth 51 of the cage 47 then, and in that event, the cage 47 and the member 53 will rotate as a unit in which event the shaft 11, shaft 22 and the shaft 23 will also rotate together.

It is apparent from the foregoing that the assembly consisting of the sun gears 33 and 43 and the pinion gears 42 constitute a differential assembly.

Operation of the device may briefly be described as follows: Let it be assumed that the device is in the disconnected position illustrated in Figure 2, in which event the drive shaft 11 and the cage 47 are not directly connected to either of the driven shafts 22 and 23. Power introduced through the drive shaft 11 will cause rotation of the cage 47. Rotation of the cage 47 likewise causes the rotation of the sider 41, and, if the resistance to the rotation in both the shafts 22 and 23 is equal, both driven shafts 22 and 23 will rotate as a unit by virtue of the differential previously described. However, in the event the resistance offered by the shafts 22 and 23 is different or, for example, if the diameter of the wheels driven through the axles 13 and 14 is different, then the axles 22 and 23 will rotate at different speeds because of the differential effect. In other words, power is equally divided by the action of the differential assembly to the driven axles 22 and 23.

Let it be assumed, however, that a direct and locked drive is desired. The member 53 is then moved to the right, as viewed in Figure 2, until the teeth 54 engage the teeth 51. In that event the members 36, 47 and 53 will be locked together and the driven shafts 22 and 23 and the drive shaft 11 will rotate as one.

We claim:

1. In a power divider, a housing, a driving shaft journalled in one end of said housing, a pair of coaxially aligned driven shafts axially aligned with said driving shaft and journalled in the opposite end of said housing, said driven shafts comprising an inner shaft and an outer tubular shaft, a substantially cylindrical cage mounted upon one end of said driving shaft and within said housing for rotational movement within said housing, a spider mounted within said cage and adapted to be rotated thereby, a sun gear fixed to each of said driven shafts, a plurality of pinion gears mounted on said spider and engaging said sun gears, annular tooth portions on the circumference of said cage, the sun gear in said tubular shaft having a radially extending portion extending parallel to one wall of said cage and having a diameter equal to the diameter of said cage, annular tooth portions on the periphery of said radially extending portion, a lock-up clutch member mounted on said tubular driven shaft and adapted to be moved longitudinally of said tubular driven shaft, annular tooth portions on said clutch member continuously and slidably engaging the annular tooth portions on said radially extending portion and adapted to mate with the annular tooth portions on said cage, and means for operating said lock-up clutch member.

2. In a power divider, a housing, a driving shaft journalled in one end of said housing, a pair of coaxially aligned driven shafts axially aligned with said driving shaft and journalled in the opposite end of said housing, said driven shafts comprising an inner shaft and an outer tubular shaft, a substantially cylindrical cage mounted upon one end of said driving shaft and within said housing for rotational movement within said housing, a spider mounted in said cage and adapted to be rotated thereby, a sun gear fixed to each of said driven shafts, a plurality of pinion gears mounted on said spider and engaging said sun gears, annular tooth portions on the outer diameter of said cage, the sun gear on said tubular shaft having a radially extending portion parallel to one wall of said cage and having a diameter substantially equal to the diameter of said cage, annular tooth portions on the periphery of said radially extending portion, a lock-up clutch member mounted on said tubular driven shaft and adapted to be moved longitudinally of the tubular driven shaft, annular tooth portions on said lock-up clutch member and adapted to mate with the annular tooth portions on said cage, the annular tooth portions on the radially extending portion of the sun gear continuously meshing with the annular tooth portions on said lock-up clutch member and being adapted to allow longitudinal movement of said annular tooth portions on said lock-up member, and means for operating said lock-up clutch member.

References Cited in the file of this patent

UNITED STATES PATENTS

| 1,173,442 | Kuhn | Feb. 29, 1916 |
| 1,920,175 | Hollos | Aug. 1, 1933 |
| 2,228,581 | Olen | Jan. 14, 1941 |

FOREIGN PATENTS

| 834,046 | Germany | Mar. 17, 1952 |